United States Patent
Ko et al.

(10) Patent No.: US 7,515,220 B2
(45) Date of Patent: Apr. 7, 2009

(54) DISPLAY DEVICE

(75) Inventors: Hyung-Seok Ko, Seoul (KR); Soo-Jin Kim, Seoul (KR); Dong-Ho Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 567 days.

(21) Appl. No.: 11/138,211

(22) Filed: May 27, 2005

(65) Prior Publication Data

US 2006/0221268 A1 Oct. 5, 2006

(30) Foreign Application Priority Data

Apr. 1, 2005 (KR) ............... 10-2005-0027524
Apr. 1, 2005 (KR) ............... 10-2005-0027525

(51) Int. Cl.
*G02F 1/1333* (2006.01)
*G02F 1/1335* (2006.01)

(52) U.S. Cl. ............... 349/58; 349/61; 349/62; 349/65

(58) Field of Classification Search ............ 349/58, 349/61–65
See application file for complete search history.

(56) References Cited

U.S. PATENT DOCUMENTS

| | | | | |
|---|---|---|---|---|
| 5,477,422 A | * | 12/1995 | Hooker et al. | 362/29 |
| 5,719,649 A | * | 2/1998 | Shono et al. | 349/65 |
| 5,779,337 A | * | 7/1998 | Saito et al. | 362/619 |
| 6,175,396 B1 | | 1/2001 | Kim et al. | |
| 6,522,373 B1 | * | 2/2003 | Hira et al. | 362/603 |
| 6,960,001 B2 | * | 11/2005 | Nitto et al. | 362/218 |

FOREIGN PATENT DOCUMENTS

| | | |
|---|---|---|
| JP | 2001-025896 | 1/2001 |
| JP | 2003-029262 | 1/2003 |
| JP | 2004-184493 | 7/2004 |
| JP | 2004-258236 | 9/2004 |
| KR | 1019980021179 | 6/1998 |
| KR | 1999-009299 | 2/1999 |
| KR | 1019990050941 | 7/1999 |
| KR | 1020010011255 | 2/2001 |
| KR | 1020010063795 | 7/2001 |
| KR | 1020040061119 | 7/2004 |

* cited by examiner

*Primary Examiner*—Julie Ngo
(74) *Attorney, Agent, or Firm*—F. Chau & Associates, LLC.

(57) ABSTRACT

A display device including a display panel displaying an image; a light source unit supplying light to the display panel, and a light guiding unit including a light guiding section which has a light receiving surface positioned adjacent to the light source unit and a light emitting surface positioned opposite to the display panel and which guides light emitted from the light source unit to the display panel, a side wall section forming a reception space for receiving the display panel along the edges of the light guiding section, and a fixing section fixing the light guiding section to the display device.

16 Claims, 5 Drawing Sheets

DISPLAY DEVICE

CROSS REFERENCE TO RELATED APPLICATION

This application claims priority to and the benefit of Korean Patent Application No. 10-2005-002755 filed on Apr. 1, 2005, and Korean Patent Application No. 10-2005-0027524 filed on Apr. 1, 2005, which are hereby incorporated by reference for all purposes as if fully set forth herein.

BACKGROUND OF THE INVENTION

1. Field of the Invention

The present invention relates to a display device, and more particularly to a display device which that improves a process of assembling a backlight assembly and enhances brightness to improve optical efficiency.

2. Description of the Related Art

Recent developments of semiconductor technologies have decreased the size and weight of display devices. Flat display panels used for small and light display devices are classified into field emission display (FED) panels, vacuum fluorescent display (VFD) panels, liquid crystal display (LCD) panels, organic light emitting display (OLED) panels, and plasma display panels (PDP). Each of the display panels listed above usually include a pair of substrates disposed that are opposed to each other, the inner space of which is kept at a high vacuum state.

For example, liquid crystal display (LCD) devices, using a liquid crystal display panel have many advantages, such as small size, light weight, and low power consumption, and are used in many different information processing apparatuses requiring a display device.

The liquid crystal display devices change a molecular alignment of liquid crystal by applying a voltage, and convert variations in optical characteristics, such as birefringence, optical rotation, dichroism, and optical scattering of liquid crystal cells which emit light due to the change in molecular alignment into a visual change. That is, the liquid crystal display devices are light-receiving display devices which display data using modulation of light by the liquid crystal cells.

The liquid crystal display device as a light receiving display device is supplied with light from a backlight assembly, and displays images on a liquid crystal display panel. A light source unit of the backlight assembly emits light that is guided by a light guiding plate. The brightness of the light is enhanced through an optical sheet group that is positioned on the light guiding plate, and the light is subsequently supplied to the liquid crystal panel.

The conventional backlight assembly includes many elements, such as a light source unit, a light guiding plate, an optical sheet group, and a mold frame for receiving and supporting the elements.

Accordingly, since the process for assembling the backlight assembly is complicated, the assembling process time increases and the probability that failures occur during the assembling process increases. In addition, when the elements forming the backlight assembly are moved or shifted in position due to an external impact, etc., it is difficult to effectively utilize the light emitted from the light source unit. In particular, for example, when the display device has two display panels, respectively fitted to the front and rear surfaces of a folding portion of a device, such as a mobile phone, the structure of the backlight assembly is more complicated, and thus the above-mentioned problems may become more severe.

Further, a leakage of light may occur in the optical path before the light emitted from the light source unit reaches the light guiding plate and is guided by the light guiding plate, thereby causing a loss of brightness.

SUMMARY OF THE INVENTION

This invention provides a display device which that improves a process of assembling a backlight assembly and enhances brightness to improve optical efficiency.

Additional features of the invention will be set forth in the description which follows, and in part will be apparent from the description, or may be learned by practice of the invention The present invention discloses a display device that includes a display panel displaying an image, a light source unit supplying light to the display panel, and a light guiding unit including a light guiding section including a light receiving surface that is opposed to the light source unit, a light emitting surface that is opposed to the display panel and which guides light emitted from the light source unit to the display panel, a side wall section defining a space is for receiving the display panel along an edge portion of the light guiding section, and a fixing section fixing the light guiding section.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
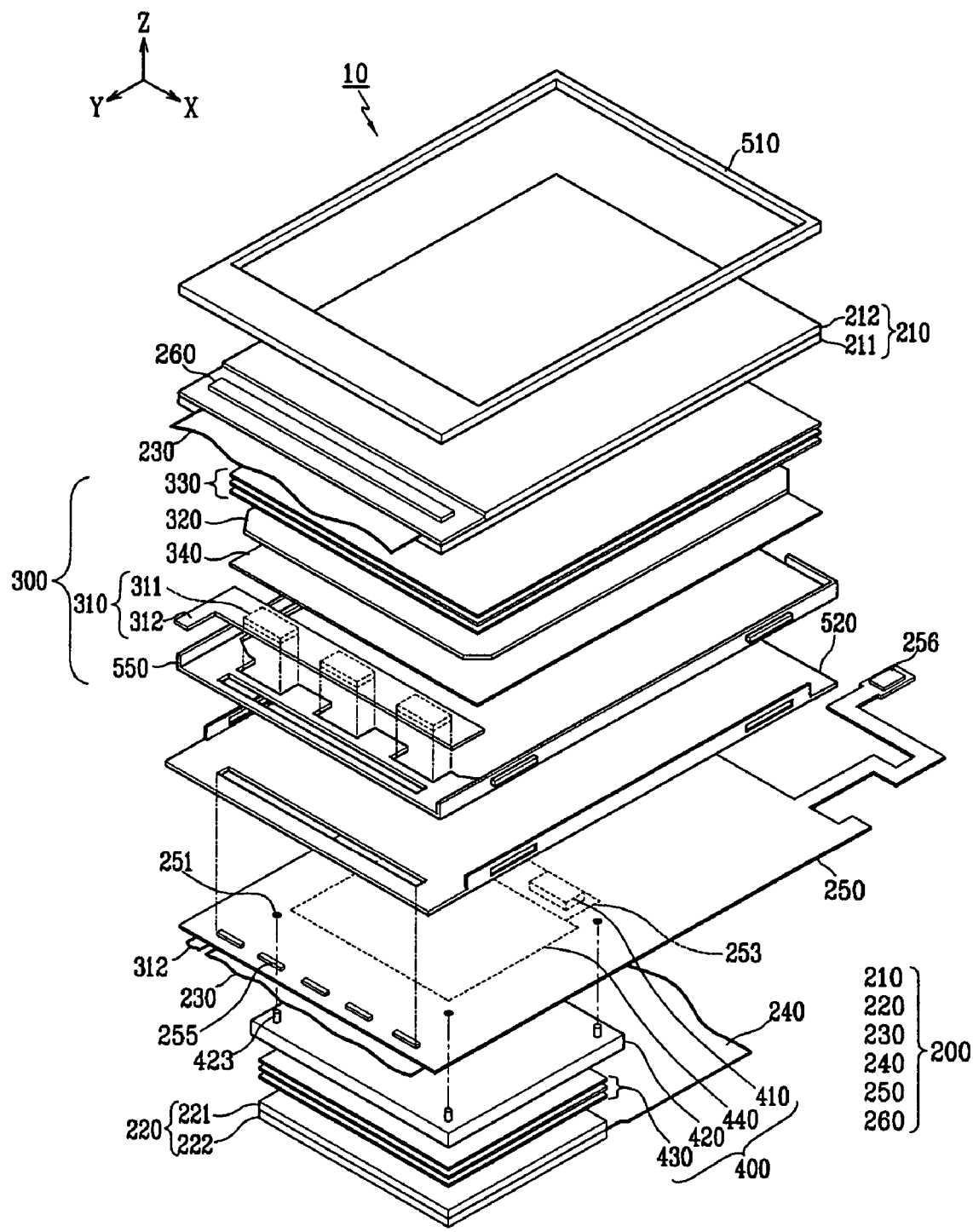
FIG. 1 is an exploded perspective view illustrating a display device according to an embodiment of the invention.

Hereinafter, display devices according to embodiments of the present invention will be described in detail with reference to the attached drawings. In the drawings, a display device employing a twin backlight assembly, that is, a dual folding type mobile phone, is schematically illustrated as an example. The embodiments of the present invention are intended only to exemplify the present invention, and thus the present invention is not limited to the embodiments.

Elements not associated with practice of the present invention are omitted for the purpose of convenience, and elements equal or similar to each other in the whole specification are denoted by the same reference numerals.

An embodiment of the invention is described below with reference to FIGS. 1, 2, 3, and 4.

As shown in FIG. 1, a display device 10 may include a display panel assembly 200, and backlight assemblies 300 and 400 for supplying light to display panels 210 and 220, respectively. The display device 10 may further include a top chassis 510, a mold frame 550, and a bottom chassis 520 so as to fix and/or support the display panel assembly 200 and backlight assemblies 300 and 400.

The display panel assembly 200 includes a main panel unit 210, a sub panel unit 220, a first flexible circuit board 230, a second flexible circuit board 240, a printed circuit board 250, and an integrated circuit chip 260. The integrated circuit chip 260 is formed in the form of COF (Chip On Film) or TCP (Tape Carrier Package).

Although two panel units 210 and 220 are shown in FIG. 1, the invention is not limited to having two panel units 210 and 220. Two or more panel units, that is, at least two panel units, may be included. Similarly, although two liquid crystal display panels are shown as the panel units 210 and 220 in FIG. 1, this is intended to exemplify the panel units used for the present invention and the invention is not limited thereto. Therefore, one or more liquid crystal display panels may be included, or other light-receiving display panels may be used.

The main panel unit 210 is larger than the sub panel unit 220 that is opposed to the main panel unit 210. The display device 10 may be used particularly, for example, with a folding or flip-type of mobile phone, where the main panel unit 210 is provided in the inner surface of the folding portion and the sub panel unit 220 is provided in the outer surface of the folding portion. Therefore, when a folding portion of the folding device is closed, a relatively small amount of information, such as time, may be displayed in the sub panel unit 220 having the small screen size, and when the folding portion is opened, e.g., for communication, a relatively large amount of information may be displayed in the main panel unit 210 having the large screen size.

The internal structure of the main panel unit 210 employing a liquid crystal display panel is described below. Since the structure of the sub panel unit 220 is substantially equivalent to that of the main panel unit 210, a detailed description of the sub panel unit 220 is omitted.

The main panel unit 210 includes a first TFT panel 211 on which a plurality of thin film transistors (TFT) are formed, a first color filter panel 212 that is opposed to the first TFT panel 211, and liquid crystal (not shown) provided between the panels 211 and 212. Although not shown, a polarizing plate is attached with the front surface of the first color filter panel 212 and the rear surface of the first TFT panel 211, so as to linearly polarize visible rays supplied from the backlight assembly 300.

The first TFT panel 211 includes a plurality of gate lines and a plurality of data lines formed in a matrix shape on a transparent insulating substrate (not shown), thin film transistors formed at the intersections between the gate lines and the data lines (not shown), and pixel electrodes which are coupled with the thin film transistors and which are made of a transparent conductive material, such as ITO (Indium Tin Oxide). In the thin film transistors, a source terminal is connected with the data line, a gate terminal is connected with the gate line, and the drain terminal is connected with the pixel electrode.

Therefore, signal data is delivered to the gate lines and the data lines of the main panel unit 210 through the first flexible circuit board 230 from the printed circuit board 250, and are input to the source terminals and the gate terminals of the thin film transistors. The thin film transistors are turned on or off depending upon the signal data, thereby switching the pixel electrodes that are connected with the drain terminals thereof.

The first color filter panel 212 is opposed to and is disposed on the first TFT panel 211. In a non-limiting example, the first color filter panel 212 may be a panel on which pixels of three primary colors, e.g., red, green, and blue, or cyan, magenta, and yellow, as color pixels exhibiting predetermined colors at the time of transmitting light are formed, and a common electrode made of ITO is formed on an entire surface of the first color filter panel 212. Thus, when the thin film transistors as switching elements are turned on, an electric field is formed between the pixel electrodes and the common electrode. The alignment angle of liquid crystal molecules provided between the first TFT panel 211 and the first color filter panel 212 is changed due to the electric field, thereby obtaining a desired image change in light transmittance due to the change in the alignment angle.

To control the alignment angle of liquid crystal molecules and the timing of aligning the liquid crystal molecules, the gate lines and the data lines of the first TFT panel 211 are supplied with driving signals and timing signals. The integrated circuit chip 260 is positioned or mounted on the first TFT panel 211 and may be covered with a protective film. The integrated circuit chip 260 is supplied with driving signals from the printed circuit board 250 through the first flexible circuit board 230, generates a data driving signal and a gate driving signal for driving the main panel unit 210 and a plurality of timing signals for supplying the signals at proper timing, and transmits the gate driving signal and the data driving signal to the gate lines and the data lines, respectively, of the main panel unit 210.

The sub panel unit 220 includes a second TFT panel 221 and a second color filter panel 222, and is supplied with the driving signals from the printed circuit board 250 through the second flexible circuit board 240 through another integrated circuit chip (not shown).

A plurality of ohmic elements 255 are mounted on the printed circuit board 250 for supplying signals to the first flexible circuit board 230 and the second flexible circuit board 240, and an external connector, such as a mobile phone connector 256, is fitted to an end thereof. The first flexible circuit board 230 is supplied with a signal indicating a degree or angle of opening and closing of the folding portion window through the mobile phone connector 256. The first flexible circuit board 230 connects the main panel unit 210 with the printed circuit board. Although the first flexible circuit board 230 is cut off for the purpose of convenient explanation in FIG. 1, the first flexible circuit board 230 is connected with the main panel unit 210 to form a body.

The backlight assembly includes a first backlight assembly 300 and a second backlight assembly 400, which supply light emitted from the light source units 310 and 410 to the main panel unit 210 and the sub panel unit 220, respectively, and which are in contact with each other between both the main panel unit 210 and the sub panel unit 220. According to the embodiment of the invention discussed above and shown in FIG. 1, the first backlight assembly 300 is received or positioned in the mold frame 550 and the second backlight assembly 400 is attached onto and coupled with the printed circuit board 250.

The first backlight assembly 300 includes a first light source unit 310 supplying light to the main panel unit 210, a light guiding plate 320 guiding the light emitted from the first light source unit 310, a reflecting sheet 340 reflecting light, a first optical sheet group 330 enhancing brightness of the light emitted from the light guiding plate 320 and supplying the light to the main panel unit 210, and a mold frame receiving and supporting at least the above described components of the first backlight assembly 300.

Figure 4:
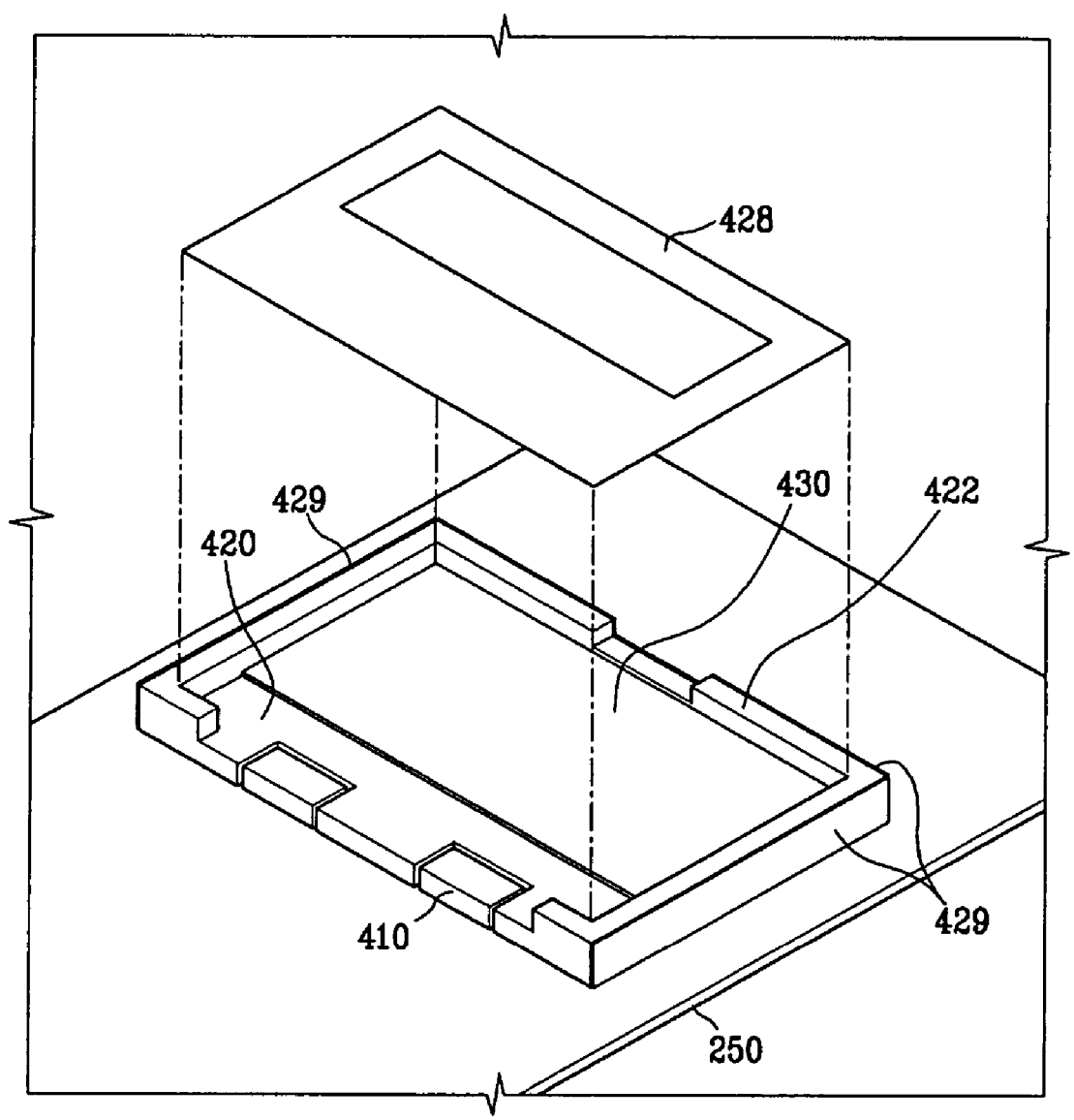
FIG. 4 is a perspective view illustrating a light shielding film and a reflecting film attached to the light guiding unit shown in FIG. 1.

Although light emitting diodes (LED) positioned or mounted on the flexible board 312 are shown in FIG. 1 as the first light source unit 310, such are shown as one example of the first light source and the invention is not limited thereto. Therefore, as the first light source unit 310, another light source such as a lamp may be used, and in addition a line light source and a surface light source in which the light emitting diodes 311 are made into modules may be used. Although three light emitting diodes 311 are shown in FIG. 4, it is understood that the invention is not limited thereto and the number of light emitting diodes 311 may be variously set as needed. The flexible board 312 is connected with the printed circuit board 250 and is supplied with a light source control signal therefrom, thereby driving the first light source unit 310.

The first optical sheet group 330 includes a diffusion sheet for diffusing light to improve uniformity of the light such that the light going toward the main panel unit 210 is not partially condensed in the light guiding plate 320 to form stains in the main panel unit 210, and a prism sheet for improving the brightness of light by making the light passing through the diffusion sheet travel through the main panel unit in a perpendicular direction. The first optical sheet group 330 may further include a protective sheet protecting the diffusion sheet and the prism sheet, which are sensitive to dust, scratches or other such contaminants, and preventing introduction of particles.

The reflecting sheet 340 reduces the loss of light and helps the diffusion of light by reflecting the light emitted in the opposite direction of the main panel unit 210 through the light guiding plate 320 toward the light guiding plate 320 again, thereby improving the uniformity of the light traveling toward the main panel unit 210.

The mold frame 550 receives and supports the first light source unit 310, the light guiding plate 320, the reflecting sheet 340, and the first optical sheet group 330, and receives and supports the main panel unit 210 therewith. A top chassis 510 and a bottom chassis 520 are provided at the top and bottom portions of the mold frame 550, respectively, to receive the above-described elements. The top and bottom portions of the mold frame 550 are coupled with each other at the sides of the mold frame 550.

The second backlight assembly 400 includes a second light source unit 410 supplying light to the sub panel unit 220, and a light guiding unit 420, which is coupled to the printed circuit board 250 and guides the light emitted from the second light source unit 410 to the sub panel unit 220 and receives and supports the second optical sheet group 430 and the sub panel unit 220. The second backlight assembly 400 may further include a reflecting plate 440 provided between the light guiding unit 420 and the printed circuit board 250. The printed circuit board is directly coupled with the light guiding unit 420 and is disposed below the bottom chassis 520.

A fastener hole 251 may be formed in a predetermined position of the printed circuit board 250 that is coupled with the light guiding unit 420. The reflecting plate 440 is mounted on at least a part of the printed circuit board 250 coupled to the light guiding unit 420. The reflecting plate 440 may be mounted on the printed circuit board 250 according to various techniques, such as using a double-sided tape or an adhesive.

The second light source unit 410 may be directly mounted on the surface of the printed circuit board 250 that is coupled with the light guiding unit 420. The second light source unit 410 includes light emitting diodes and may be directly mounted on the printed circuit board 250 using a soldering technique.

A reflecting film 253 is formed on a surrounding area of the second light source unit 410 on the printed circuit board 250. For example, the reflecting film 253 may be formed using a silk coating method. Also, the reflecting film 253 may be made of a material including silver (Ag) paste. Since the reflecting film 253 has a white or silver color, the reflecting film 253 reflects light. The reflecting film 253 prevents the loss of light that may occur while the light emitted from the second light source unit 410 is supplied to the sub panel unit 220 through the light guiding unit 420. Specifically, the reflecting film 253 prevents the loss of light that may occur before the light emitted from the second light source unit 410 reaches the position where the reflecting plate 440 is formed.

Thus, according to an embodiment of the invention, since the second light source unit 410 in the display device 10 is directly mounted or attached to the printed circuit board 250, the assembly process may be simplified. Therefore, the reflecting film 253 is formed on the printed circuit board 250 to prevent the loss of light that may occur in an optical path before the light emitted from the second light source unit 410 reaches the reflecting plate 440. For example, until the light is guided by the light guiding unit 420, it is possible to improve or increase the brightness and to maximize optical efficiency.

Figure 2:
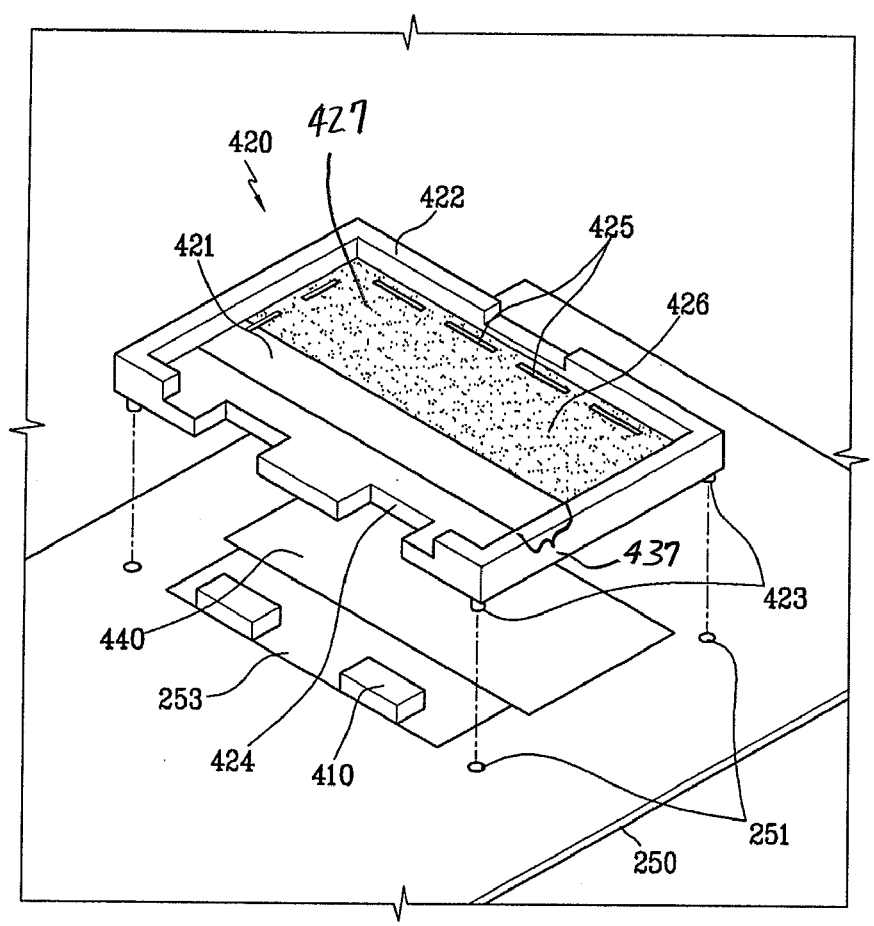
FIG. 2 is a perspective view illustrating a coupling state of a light guiding unit and a printed circuit board shown in FIG. 1.

As shown in FIG. 2, the light guiding unit 420 includes a light guiding section 421 which has a light receiving surface opposed to the second light source unit 410 and a light emitting surface opposed to the sub panel unit 220 (see FIG. 1) and which guides the light emitted from the second light source unit 410 to the sub panel unit 220, a side wall section 422 extending integrally along the edges of the light guiding section 421 toward the sub panel unit 220 and forming a reception space for receiving the second optical sheet group 430 (see FIG. 1) and the sub panel unit 220, and a fixing section 423 for fixing the light guiding section 421. According to a non-limiting example of the invention, the fixing section 423 has a pillar shape that is inserted into the fastener hole 251 of the printed circuit board 250. For example, the light guiding unit 420 may be made of a material that includes polymethylmethacrylate (PMMA) or polycarbonate (PC), which cannot be easily deformed or broken due to its high strength and high transmittance.

The light guiding section 421 includes one or more grooves 425 for preventing a leakage of light formed along the edges of the light emitting surface and a reception groove 424 formed in the light receiving surface so as to receive at least a part of the second light source unit 410. The groove 425 that prevents the leakage of light may be formed in the light guiding section 421 in a direction that is perpendicular to the light emitting surface 426 by perforating or depressing the light guiding section 421.

Figure 3:
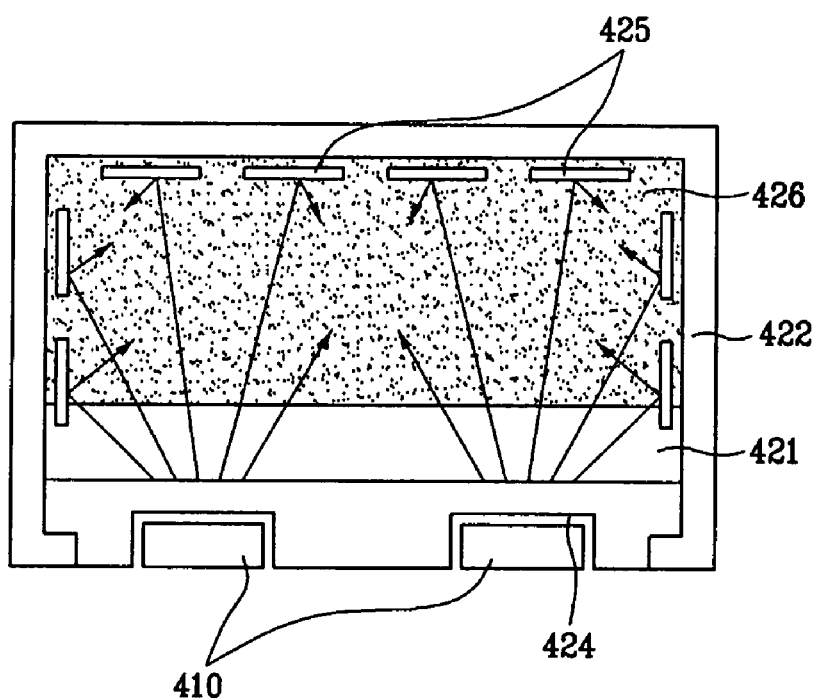
FIG. 3 is a diagram schematically showing a path of light passing through the light guiding unit shown in FIG. 1.

As shown in FIG. 3, the groove 425 prevents the leakage of light, specifically preventing light that is supplied to the light guiding section 421 from the second light source unit is 410 from leaking from the side surfaces of the light guiding section 421 as per Snell's Law, thereby enabling as much light as possible to be emitted from the light emitting surface 426. For example, Snell's Law indicates that when light travels to a medium having a small refractive index from a medium having a large refractive index, all the light is reflected and none of the light is refracted. That is, when the grooves 425 that prevent the leakage of light are formed along edge portions of the light emitting surface 426 of the light guiding section 421, the light traveling toward the side surfaces of the light guiding section 421 makes contact with air in the groove 425 that prevents the leakage of light which has a smaller refractive index than the refractive index of the light guiding section 421, the light does not leak externally, and the light reflected, e.g., substantially completely, toward the light guiding section 421. Thus, it is understood that reflection losses correspond with the refraction index.

Referring to FIG. 2, the light guiding section 421 has a predetermined pattern 427 formed on a portion of the surface of the light emitting surface 426 facing the sub panel unit 220 which is spaced by a predetermined distance from the second light source unit 410. That is, the pattern is not formed on a portion of the surface of the light emitting surface 426 facing the sub panel unit 220 which is close to the second light source unit 410, designated by 437. The length of the portion of the surface of the light emitting surface 426 on which the pattern is not formed 437 is set so that the light entering the light receiving surface may be uniformly diffused in the light guiding section 421 in accordance with Snell's Law.

The light guiding unit 420 according to an embodiment of the invention discussed above and shown in FIG. 1 may guide the light emitted from the second light source unit 410 to the sub panel unit 220, may receive and support the sub panel unit 220 and the second optical sheet group 430, and may be fixed or attached with the printed circuit board 250. Further, the groove 425 that prevents leakage of light is formed in the light guiding unit 420 and may reduce the loss of light, thereby enhancing the brightness level.

As shown in FIG. 4, a light shielding film 428 may be positioned or formed along edge portions of the second optical sheet group 430 and the light guiding section 421, which are received or positioned in the reception space formed by the side wall section 422, and a reflecting film 429 may be provided on one or more side surfaces other than the light emitting surface 426 of the light guiding section 421 among the side surfaces of the light guiding unit 420. For example, a reflecting film pattern may be printed instead of using the reflecting film.

The light shielding film 428 and the reflecting film 429 may prevent light from leaking from the surroundings of the light guiding unit 420, thereby reducing the loss of light. The light shielding film 428 may be made of a material that includes a pressure sensitive adhesive (PSA), thereby preventing looseness of the second optical sheet group 430 received in the reception space of the light guiding unit 420.

The second optical sheet group 430 may have substantially the same structure as the first optical sheet group 330 of the first backlight assembly 300 described above. The reflecting plate 440 may be provided directly on the printed circuit board 250, unlike the reflecting sheet 340 of the first backlight assembly 300, however, the reflecting plate 440 has substantially the same operational advantage as the reflecting sheet 340.

Another embodiment of the invention is described below with reference to FIG. 5.

Figure 5:
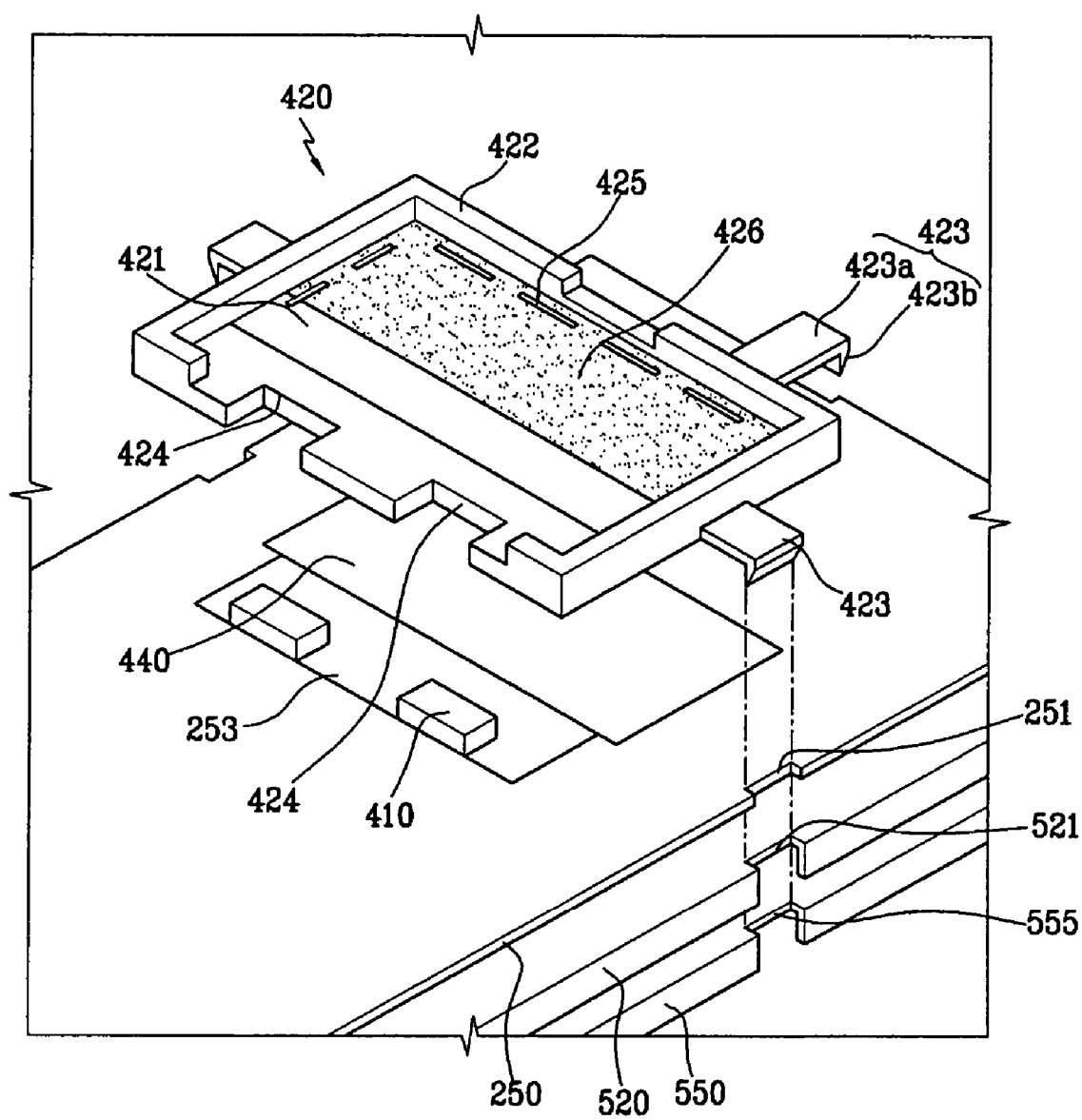
FIG. 5 is a perspective view of a coupling state of a light guiding unit, a mold frame, a bottom chassis, and a printed circuit board according to another embodiment of the invention.

As shown in FIG. 5, in a non-limiting embodiment of the invention, the display device 10 includes the light guiding unit 420 having a hook-shaped fixing section 423, and a mold frame 550 having a fastener groove 555 formed to be coupled with the fixing section 423. The fixing section 423 of the light guiding unit 420 includes a protruded portion 423a extending from the side wall portion 422 in a direction parallel to the light guiding unit 421, and a hooking portion 423b bent from the protruded portion 423a toward the mold frame 550.

The printed circuit board 250 and the bottom chassis 520 area provided between the mold frame 550 and the light guiding unit 420 and each have perforated grooves 251 and 521 formed such that the fixing section 423 of the light guid-ing unit 420 may be fastened or attached with the fastener groove 555 of the mold frame 550, respectively. By coupling the mold frame 550 with the light guiding unit 420, the bottom chassis 520 and the printed circuit board 250 disposed therebetween are coupled with the mold frame 550 and the light guiding unit 420. Similar to the first embodiment, a reflecting plate 440 may be mounted on at least a part of the printed circuit board 250 that is coupled with the light guiding unit 420, and a reflecting film 253 is formed to surround the second light source unit 410.

Accordingly, the light guiding unit 420, which guides the light emitted from the second light source unit 410 to the sub panel unit 220 and receives and supports the sub panel unit 220 and the second optical sheet group 430, may be fixed or attached with the mold frame 550. Further, the mold frame 550, the bottom chassis 520, the printed circuit board 250, and the light guiding unit 420 may be coupled together.

Although the structure of the light guiding unit has only been described and shown as applying to the second backlight assembly, this is intended to exemplify the structure and arrangement of the display device according to the present invention, and the present invention is not limited to the embodiments. Therefore, the structure of the light guiding unit according to the present invention may be applied to the first backlight assembly, and the structure and arrangement of the display device may be modified in various forms.

As described above, in the display device according to the present invention, the display panel and the optical sheet group may be stable and sufficiently supported while guiding the light from the light source unit to the display panel. Further, the display panel and the optical sheet group may be easily coupled with the printed circuit board and the mold frame. Further, the groove that prevents leakage of light may reduce the loss of light, thereby enhancing brightness.

In addition, since the reflecting film may be formed on or directly on the printed circuit board surrounding the light source unit, the loss of light which can occur before the light emitted from the light source unit reaches the reflecting plate may be prevented, thereby maximizing optical efficiency.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
   a display panel displaying an image;
   a light source unit mounted on a printed circuit board and supplying light to the display panel; and
   a light guiding unit including a light guiding section comprising:
   a light receiving surface positioned adjacent to the light source unit,
   a light emitting surface positioned facing the display panel and which guides light emitted from the light source unit to the display panel,
   a side wall section defining a space for receiving the display panel, and
   a fixing member fixing the light guiding unit to the printed circuit board.

2. The display device of claim 1, wherein the light guiding unit further comprises:
   a light leakage preventing groove formed along at least one edge portion of the light emitting surface.

3. The display device of claim 1, wherein the light guiding unit further comprises:
a reception groove provided in the light receiving surface that receives at least a part of the light source unit.

4. The display device of claim 1, wherein a pattern is formed on a portion of the light emitting surface facing the display panel.

5. The display device of claim 1, further comprising:
an optical sheet group received in the space formed by the side wall section,
wherein a light shielding film is provided along the edge portions of the light guiding unit and the optical sheet group.

6. The display device of claim 1, wherein a reflecting film is provided on a side surface other than the light emitting surface of the light guiding section from among the side surfaces of the light guiding unit.

7. The display device of claim 1,
wherein the printed circuit board transmits a driving signal to the display panel.

8. The display device of claim 7, wherein the printed circuit board comprises:
a fastener groove,
wherein the fixing member of the light guiding unit is fastened.

9. The display device of claim 8, further comprising:
a reflecting plate provided on the light guiding unit.

10. The display device of claim 7, wherein the light source unit is provided directly on the printed circuit board.

11. The display device of claim 10, further comprising:
a reflecting film surrounding the light source unit.

12. The display device of claim 11, wherein the reflecting film is formed by a silk screen coating.

13. The display device of claim 11, wherein the reflecting film comprises silver paste.

14. The display device of claim 1, wherein the light source unit comprises a light emitting diode.

15. The display device of claim 1, wherein the fixing member is inserted into a fastener hole of the printed circuit board.

16. The display device of claim 15, wherein the fixing member has a pillar shape.

* * * * *